Patented May 5, 1942

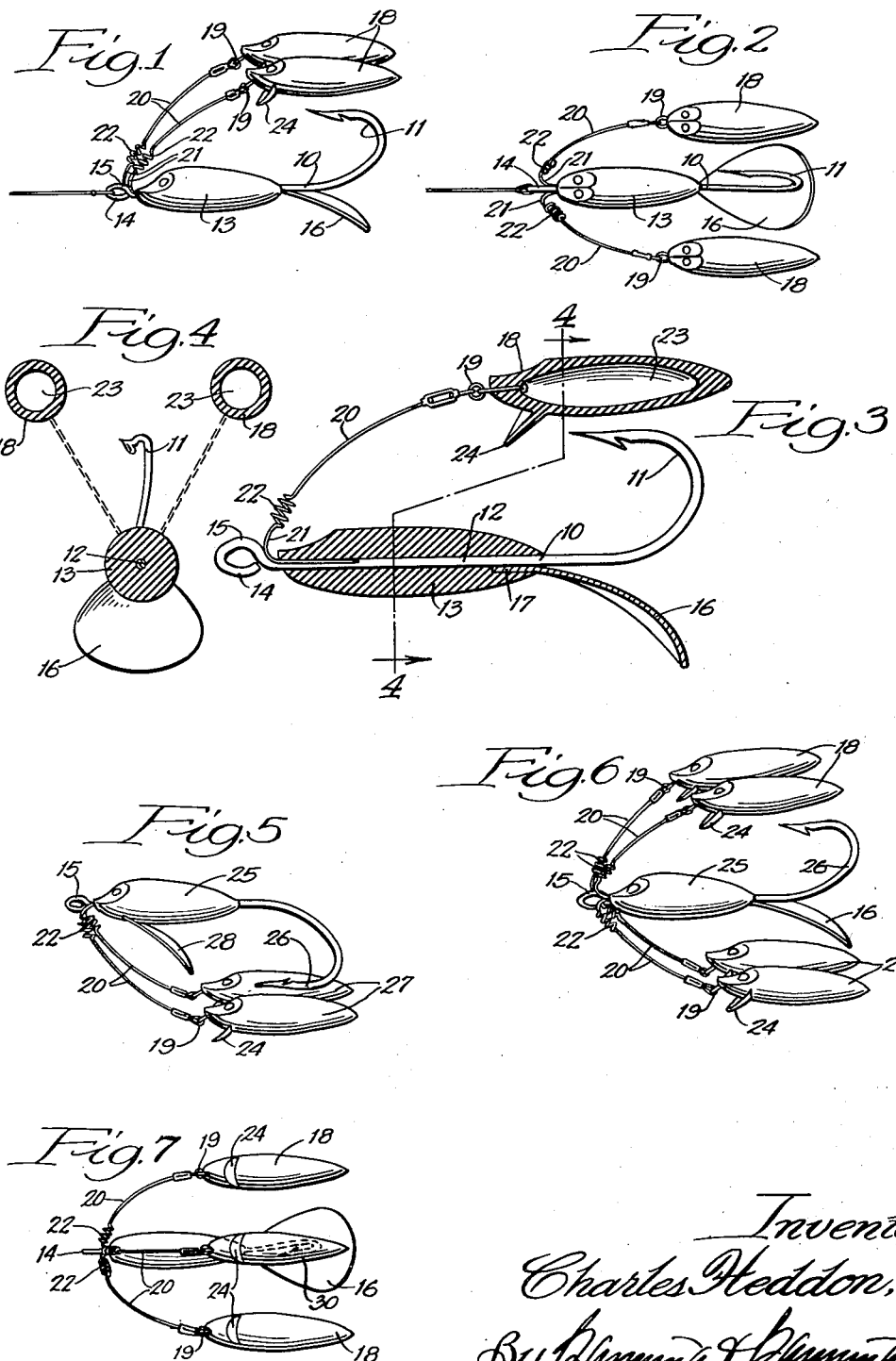

2,281,578

UNITED STATES PATENT OFFICE 2,281,578

MULTIPLE PLUG BAIT

Charles Heddon, Dowagiac, Mich., assignor to James Heddon's Sons, Dowagiac, Mich., a corporation of Michigan Application November 16, 1940, Serial No. 365,889

12 Claims. (Cl. 43—42)

The present invention belongs to what is commonly known in the fishing bait art as the plug type of bait, by which is meant a bait having a body made in the general proportions and shape of a small fish adapted, by reason of the configuration of its nose structure or by the provision of a depending lip, to develop a swimming movement when drawn through the water, and having a degree of weight in relation to its size which permits it to be readily cast from a free running reel. Furthermore, such baits are characteristically decorated in colors to more or less resemble the color markings of a live minnow and are usually provided with artificial eyes of glass or produced by coloring.

The spirit and heart of this invention is to provide the essential degree of weight for casting, a normal degree of visible bait body area to attract the attention of the fish, and to afford the type of attractive swimming action found in a large single plug body, but to divide the bait structure into a plurality of bodies, thereby making it possible, because of the ready displacement of the individual bodies, or collapsibility of the structure as a whole, to procure effective results with the use of a single hook.

In plug baits of the conventional type, in order to insure the hooking of fish, it has been customary to provide two or more gangs of hooks which, among fishermen of the more refined type, is regarded as a somewhat unsportsmanlike method of hooking fish as compared with the use of a single hook. At the same time the provision of multiple gangs upon certain types of baits is likely to interfere with a satisfactory action of the bait in the water, and interferes with the orderly storing of baits in a tackle box, and is frequently the cause of accidents in casting or landing the fish. Furthermore, the employment of multiple gang hooks frequently results in the loss of fish, especially when fishing among logs or obstructions, since a hooked fish in its struggles will frequently impale one or more of the free hooks into a log or similar unyielding obstruction, which thus affords the necessary resistance to enable the fish to escape.

The use of a single hook on a plug bait body of conventional type has proven unsatisfactory, for the reason that the fish will often strike the body of the bait, and especially one of large enough size to afford the necessary buoyancy, without engaging the single hook, since the bait body affords positive resistance to the closing of the fish's jaws, and unless the strike brings the jaws directly against the barbed end of the hook, the chances of hooking the fish are impaired. This circumstance has led to the employment of multiple gangs, with the objections previously noted.

Furthermore, with multiple gangs, it has been difficult or impossible to adequately weed-guard the hooks and still retain reasonable hooking certainty, so that the use of plug baits thus constructed has been mainly limited to fishing in weedless waters, although, as all fishermen are aware, the best fishing grounds are generally found in weed beds or among the lily pads.

Prior to the introduction of plug baits, fish were readily hooked on spinner lures provided with single hooks concealed by feathers or tufts of bucktail hairs, which offer no resistance to the mouth or jaws of the fish when closing on the hooks, but such baits lack the necessary compactness and weight to well adapt them for casting from a free running reel with the accuracy afforded by plug baits which, together with the durability, buoyancy and swimming action of the plugs, has accounted for the popularity of such baits during more recent years.

Single hook baits have also been employed with a substantially flat metallic spoon body, to which a hook was rigidly secured at various positions within the bowl of the spoon, but such types of baits are lacking in the buoyant element, not being susceptible to the attractive and life-like swimming movement of the plug bait. However, such spoon baits are adaptable to greater hooking certainty than is the plug type of bait, when said plug bait is equipped with a single hook only, as the fish will invariably close its mouth on the flattened surface of the spoon, thereby coming in contact with the hook point, with much greater certainty than where a single hook is used on the comparatively conventional round body of a plug bait.

The lure of the present invention affords the necessary weight and any desirable degree of buoyancy and area by dividing the lure into a multiplicity of smaller bait bodies, the aggregate of which provides the essential casting weight and area of visibility to the fish, but at the same time does not present a single comparatively large resistant surface to obstruct the closing of the fish's jaws directly on the hook or hooks employed.

The structure of the present invention provides a high degree of collapsibility as a whole, or more properly speaking, displacement of the several individual bodies, the same in effect as is secured in the bucktail or feathered types of lures, and also so locates the hook with relation to the bait bodies as to effectively weed-guard the hook, thus enabling its use under fishing conditions which preclude the use of the gang type of single bodied plug baits.

Furthermore, the method of constructing and mounting the individual bait bodies permits the same to dive or dart freely and more or less independently of the movement of the other bodies, thus presenting the appearance of a closely congregated school of small minnows.

Further objects and details will appear from the description of the invention in conjunction with the accompanying drawing, wherein, Figure 1 is a side view slightly in perspective showing the fish bait of the present invention;

Fig. 2 is a top plan view of the same;

Fig. 3 is a sectional elevation through the draft body and one of the trailing bodies;

Fig. 4 is a cross sectional view taken on line 4—4 of Fig. 3; and

Figs. 5, 6, and 7 are views showing various possible modifications in the bait of the present invention.

The bait in the form shown in Figures 1 to 4 consists of a single hook 10 the bent barbed end 11 of which is turned upwardly. The shank 12 of the hook extends through a bait body 13 which may be conveniently referred to as the draft bait body, and which it is preferred to form of lead or the like in order to afford the necessary weight and compactness for casting purposes, and to assist in insuring that the bait as a whole operates in an upright position when being retrieved. It will be understood, however, that if adequate weight is otherwise provided, the shank of the hook may remain bare without the provision of the so called draft bait body, as shown.

The hook shank at its forward end terminates in a line tie eye 14 of ovate looped configuration, with the upper turn 15 of the loop standing obliquely to afford a desirable weed-guarding effect in a manner which will more fully appear. Where the draft bait body is employed, it is preferred to give it the conventional ovate or tapered formation of the conventional plug body, suggesting the configuration of a natural minnow.

In order to counteract the tendency of the tail end of the draft bait body to sink under the weight of the rearwardly projecting hook, a downwardly and rearwardly extending metallic lip 16 is provided, with its forward end 17 entered into the tail of the draft bait body immediately beneath the hook and firmly embedded therein. The draft portion of the bait comprising the hook (with or without a draft body) coacts, in the form now being described, with a pair of trailing bait bodies 18, which are freely connected by eyes 19 to the free ends of spring wire prongs 20, which are recurved at their converging forward ends 21 which extend rearwardly through the head portion of the draft bait body, and which are preferably soldered or otherwise rigidly secured to the hook near its forward end, though they need not be directly connected with the hook itself save through the medium of the draft body itself.

In order to afford the necessary flexibility, without danger of permanently bending the prongs 20, the prongs near their convergent forward ends may if desired be provided with spiral spring coils 22, which arrangement permits the prongs to deflect inwardly toward the hook when subjected to a very slight pressure. From an inspection of Fig. 4, it will be noted that the three bait bodies occupy positions at the three points of a triangle, with the hook point lying near the central position, so that, when the fish strikes with open jaws at the lure as a whole, the trailing bodies will be readily displaced, collapsing the bait as a whole, and thus pressing the point unobstructedly to the jaws of the fish.

The trailing bait bodies are preferably made of tenite or other suitable plastic composition of the character now frequently employed in the manufacture of bait bodies, and are cast or molded to afford an interior chamber 23 of a size to afford the desired degree of buoyancy. Furthermore, each of the trailing bait bodies, near its forward or head end, is provided with a depending resistance lip 24 which extends obliquely forward in a downward direction and is properly configured to impart a darting or wiggling motion to the bait body in simulation of the movements of a swimming minnow.

Although the arrangement shown in Figs. 1 to 4 inclusive has proven very satisfactory in action, the trailing bait bodies may be otherwise arranged, as shown in the remaining figures. Thus in Fig. 5 I have shown a draft body 25 having a downwardly projecting hook 26, and two trailing bodies 27 arranged to lie on opposite sides of the hook point, being a mere reversal in arrangement as compared with that shown in Fig. 4. With the trailing bodies lying below and on opposite sides of the draft body, it is desirable to provide a depending lip 28 extending downwardly and backwardly below the head of the draft bait body rather than from the tail end thereof in order to avoid interference with the hook point. In the arrangement of Fig. 5 it will, of course, be necessary to properly distribute the weight among the bait bodies in order to ballast the bait as a whole and maintain it in an upright position.

In Fig. 6 I have shown a group of four trailing bodies, the upper bodies 18 being arranged as in Fig. 1 and the lower body 27 being arranged as in Fig. 5. In other respects the bait body of Fig. 6 is like that first described.

In Fig. 7 I have illustrated a group of three trailing bait bodies, which simply supplements the arrangement shown in Fig. 2, with a center trailing bait body 30 which underlies the draft body and the upwardly turned hook, and with the weight properly distributed to ballast the bait.

The various modifications herein shown serve to illustrate exemplifications of the principle involved, but it will be understood that it is not the intention to strictly limit the invention to the various arrangements shown, since the trailing bodies may be otherwise positioned in such a way as to collectively afford the necessary weight and surface area to simulate the appearance of a school or group of small minnows swimming through the water.

It is a characteristic feature of the present invention that the trailing constituents of the bait shall be freely or loosely linked to diverging prongs or the like and that the trailing elements shall be so configured as to individually develop a limited diving, darting, or wiggling movement, which of course will be somewhat restricted in amplitude by the flexible connections with the draft element, and which will also be accentuated by diving or darting movements imparted to the bait as a whole by the structure and configuration of the draft element itself, which is designed to roll and dart through the water when being retrieved.

Such movements will be imparted by the downwardly curving depending lip secured to the tail end of the draft body, or directly to the hook shank, as the case may be, which affords the necessary water resistance to lift the rear end of the hook, causing the bait as a whole to assume a comparatively parallel position to the line of draft and at the same time to impart rolling or wiggling movements thereto where such movements are desired. The depending lip, moreover, may be nickeled to impart flashes of light, which adds to the attractiveness of the bait. It will be understood, however, that where such a darting or wiggling movement of the bait as a whole is not desired, the draft bait body may be reduced in size, or omitted, together with the lip, so that the swimming movements will be confined solely or mainly to the trailing bait bodies without any considerable action in the bait as a whole.

However, where a lip or the like is employed, the bait as a whole will partake of a general wiggling or undulatory movement, which is supplemented by the darting or wiggling movements of the trailing bait bodies, so that the whole will present an extremely active and lifelike appearance in simulation of a group or school of minnows. Moreover, the arrangement and location of the trailing bait bodies with respect to one another and to the draft body are such that the various constituents will not readily become tangled in casting, but if they do become tangled in the air, or when the bait strikes the water, the depending lips of the bait bodies will offer considerable resistance to the water during retrieving, which thereby serves to untangle them and cause them to resume their normal trailing and swimming position.

The arrangement of the trailing bait bodies is also one which brings them into overlapping relation with the rear end of the draft bait body and into surrounding relation with the hook point, so that they will serve to effectively deflect weeds, grass, or lily pads, without the necessity of providing a weed-guard of the conventional type for the hook point. At the same time the whole structure will be readily collapsible toward the hook shank, and will offer no material impediment to the closing of the fish's jaws, so that when a strike is registered, the inward deflection of the trailing bait bodies will readily expose the tip of the hook to the jaws of the fish.

The metallic lip 16 (or 28 as the case may be) on the draft bait body presents an extended surface which retards the rapid sinking of the tail end of the bait under the added weight of the hook, especially when retrieving is delayed by the fouling of the line, or from other sources, while holding the bait substantially level and in the direction of draft while being retrieved. By bringing all of the conventional connecting prongs into convergent relation at or in front of the draft body, and by recurving the forward ends in the manner shown, and by affording an oval forward turn to the line tie at the point 15, adequate provision is made against the lodgment of weeds or grass at the forward end of the bait and in insuring their upward and lateral deflection in such a way as to prevent fouling of the bait when fishing in weedy waters.

As shown, the draft bait body is made of lead while the trailing bodies are relatively buoyant, which arrangement enables the trailing bodies to be made relatively small without sacrifice in the aggregate casting weight of the bait as a whole, but it will be understood that the trailing bodies may themselves be made of a size to afford the necessary casting weight, in conjunction with the hook, so that the draft body may be reduced in size or dispensed with altogether, since the main purpose in view is that of creating the illusion of a swimming school of minnows, which are so arranged as to surround and protect the hook against fouling, without interference with the ready exposure of the hook point to the jaws of the fish when striking.

I claim:

1. In a multiple plug bait, the combination of a hook and a plurality of plug bait bodies normally held in spaced relation to one another and connected to operate on a single draft line, one of the members being provided with a depending lip adapted to impart swimming movements to the bait as a whole and indirectly to each of the connected plug bait bodies.

2. A fish bait comprising a hook and a plurality of trailing plug bait bodies normally located in laterally spaced outstanding position to overlap and yieldably shield one another and in spaced relation to the hook point and each adapted to develop a swimming motion in simulation of a live minnow, and means freely connecting the trailing bait bodies with the shank of the hook and adapted to permit displacement of the bait bodies to expose the point of the hook and a draft body having connection with the remaining bait members.

3. A fish bait comprising a hook and a plurality of trailing plug bait bodies normally located in spaced relation to one another and in spaced relation to the hook point and each configured to develop a swimming motion in simulation of a live minnow, and means freely connecting the trailing bait bodies with the shank of the hook to permit displacement of the bait bodies to expose the tip of the hook, and a draft body mounted in fixed relation to the hook and having a lip member depending therefrom in position to afford water resistance and impart active movement to the draft bait body and to the trailing bait bodies associated therewith.

4. A fish bait comprising a hook and a plurality of trailing plug bait bodies normally located on opposite sides of the hook and in spaced relation to one another and to the hook point and each provided with a depending resistance lip adapted to impart active movements thereto, and a plurality of spring prongs converging at their forward ends and connected with the shank of the hook near its forward end and having the trailing bait bodies freely linked to the diverging rear ends of the prongs, the prongs being yieldable under the impact of a fish's jaws to expose the point of the hook.

5. A fish bait comprising a hook and a plurality of trailing plug bait bodies normally located on opposite sides of the hook and in spaced relation to one another and to the hook point and each provided with a depending resistance lip adapted to impart active movements thereto, a plurality of connecting members converging at their forward ends and connected with the shank of the hook near its forward end and having the trailing bait bodies freely linked to the diverging rear ends of said members to permit displacement under the impact of a fish's jaws to expose the point of the hook, and a draft bait body secured to the shank of the hook and having its rear end in overlapping relation to the forward ends of the trailing bait bodies.

6. A fish bait comprising a hook and a plurality of trailing plug bait bodies normally located on opposite sides of the hook and in spaced relation to one another and to the hook point and each provided with a depending resistance lip adapted to impart active movements thereto, a plurality of spring prongs converging at their forward ends and connected with the shank of the hook near its forward end and having the trailing bait bodies freely linked to the diverging rear ends of the prongs, the prongs being yieldable under the impact of a fish's jaws to expose the point of the hook, and a draft bait body mounted on the shank of the hook and having its rear end in overlapping relation to the forward ends of the trailing bait bodies, and a rearwardly and downwardly projecting lip shaped deflecting member adapted when retrieved to impart a lifting effect to the rear end of the draft bait body and to impart swimming movements thereto.

7. A fish bait comprising a hook and a plurality of trailing plug bait bodies normally located on opposite sides of the hook and in spaced relation to one another and to the hook point and each provided with a depending resistance lip adapted to impart active movements thereto, a plurality of spring prongs converging at their forward ends and connected with the shank of the hook near its forward end and having the trailing bait bodies freely linked to the diverging rear ends of the prongs, the prongs being yieldable under the impact of a fish's jaws to expose the point of the hook, and a rearwardly and downwardly depending resistance lip secured to the shank of the hook in position to impart movement thereto and to the trailing bait bodies associated therewith.

8. A fish bait comprising a hook having a relatively non-buoyant bait body mounted on the hook shank and a plurality of relatively buoyant trailing plug bait bodies laterally spaced from one another and from the point of the hook and each provided with a resistance lip adapted to develop swimming movements, and rearwardly diverging members having the trailing bait bodies freely linked to their divergent rear ends and having their convergent forward ends secured in fixed relation to the forward portion of the draft bait body.

9. A fish bait comprising a hook having a relatively non-buoyant bait body mounted on the hook shank and a plurality of relatively buoyant trailing plug bait bodies laterally spaced from one another and from the point of the hook and each of a formation adapted to develop swimming movements, and rearwardly diverging resilient prongs having the trailing bait bodies freely linked to their divergent rear ends and having their convergent forward ends secured in fixed relation to the forward portion of the draft bait body, the draft bait body being provided with a depending lip adapted to impart active motion to the draft bait body and to the trailing bait bodies associated therewith.

10. In a multiple plug bait, the combination of a hook and a plurality of plug bait bodies collectively approximating the weight of a singly formed plug bait, each plug bait body being configured to develop a swimming motion in simulation of a live minnow and normally occupying differently spaced positions relative to the hook point and yieldably connected to the hook shank to permit collective collapse to expose the hook point, the complete assembly being adapted to operate on a single draft line.

11. In a multiple plug bait, the combination of a hook and a plurality of trailing plug bait bodies, the whole collectively approximating the weight of a singly formed plug bait, each trailing plug bait body being configured to develop a swimming motion in simulation of a live minnow, a yieldable connection for each of the trailing plug bait bodies connecting the same with the hook shank and adapted to hold said plug bait bodies normally in spaced relation to one another and in lapped relation to and laterally away from the hook point, the respective trailing plug bait bodies being freely secured to the respective connections to normally permit the plug bait bodies to develop swimming motions, the complete assembly being adapted to operate on a single draft line.

12. In a multiple plug bait, the combination of a hook having a draft body surrounding the shank and a plurality of trailing plug bait bodies, the whole collectively approximating the weight of a singly formed plug bait, each trailing plug bait body being configured to develop a swimming motion in simulation of a live minnow, a yieldable connection for each of the trailing plug bait bodies connecting the same with the hook shank and adapted to hold said plug bait bodies normally in spaced relation to one another and in lapped relation to and laterally away from the hook point, the respective trailing plug bait bodies being freely secured to the respective connections to normally permit the plug bait bodies to develop swimming motions, the complete assembly being adapted to operate on a single draft line.

CHARLES HEDDON.